United States Patent
Yoshida et al.

(10) Patent No.: US 9,778,634 B2
(45) Date of Patent: Oct. 3, 2017

(54) METHOD OF CONTROLLING A TARGET APPARATUS, SELECTED FROM A PLURALITY OF APPARATUSES BASED ON A SELECTION FROM DISPLAYED APPARATUS INFORMATION, PLACE INFORMATION, OR OPERATOR INFORMATION

(71) Applicant: Panasonic Intellectual Property Corporation of America, Torrance, CA (US)

(72) Inventors: Chikara Yoshida, Kanagawa (JP); Masayuki Kozuka, Osaka (JP); Toshihisa Nakano, Osaka (JP); Tsutomu Sekibe, Osaka (JP); Jun Yamaguchi, Osaka (JP); Kazushige Yamada, Osaka (JP); Kenji Shimizu, Kanagawa (JP); Masaki Takahashi, Osaka (JP); Yuri Nishikawa, Osaka (JP); Motoji Ohmori, Osaka (JP); Hiroyuki Takemura, Osaka (JP); Takeshi Hosaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 490 days.

(21) Appl. No.: 14/378,218

(22) PCT Filed: Dec. 25, 2013

(86) PCT No.: PCT/JP2013/007597
§ 371 (c)(1),
(2) Date: Aug. 12, 2014

(87) PCT Pub. No.: WO2014/103309
PCT Pub. Date: Jul. 3, 2014

(65) Prior Publication Data
US 2015/0039100 A1 Feb. 5, 2015

Related U.S. Application Data

(60) Provisional application No. 61/746,864, filed on Dec. 28, 2012.

(51) Int. Cl.
G05B 11/01 (2006.01)
G05B 15/02 (2006.01)
(Continued)

(52) U.S. Cl.
CPC ......... G05B 15/02 (2013.01); G06F 3/04842 (2013.01); G08C 17/00 (2013.01);
(Continued)

(58) Field of Classification Search
None
See application file for complete search history.

(56) References Cited

U.S. PATENT DOCUMENTS 6,792,007 B1 * 9/2004 Hamada ................. H04H 20/16
348/E5.002
7,965,343 B2 6/2011 Takeshita
(Continued)

FOREIGN PATENT DOCUMENTS

JP 2002-125137 4/2002
JP 2003-111157 4/2003
(Continued)

OTHER PUBLICATIONS

International Search Report dated Feb. 10, 2014 in International Application No. PCT/JP2013/007597.

Primary Examiner — Adam Lee
(74) Attorney, Agent, or Firm — Wenderoth, Lind & Ponack, L.L.P.

(57) ABSTRACT

A control method for controlling at least one of a plurality of apparatuses. The control method includes: displaying candidate information and obtaining, via a network, an (Continued)

operation history of each of the apparatuses. The method includes generating a control signal for performing a predetermined control on a target apparatus, when the user confirms that the predetermined control is to be performed.

5 Claims, 13 Drawing Sheets

(51) Int. Cl.
    *G08C 17/00*     (2006.01)
    *G06F 3/0484*     (2013.01)
    *H04L 12/28*     (2006.01)

(52) U.S. Cl.
    CPC ...... *H04L 12/2803* (2013.01); *G08C 2201/40* (2013.01); *G08C 2201/42* (2013.01); *G08C 2201/93* (2013.01); *H04L 2012/285* (2013.01)

(56) References Cited

U.S. PATENT DOCUMENTS

| | | | | |
|---|---|---|---|---|
| 8,305,231 B2* | 11/2012 | Fujii | ............. | F23N 5/242 340/870.02 |
| 2003/0218613 A1* | 11/2003 | Yamamura | ............. | G08C 17/00 345/520 |
| 2005/0131991 A1* | 6/2005 | Ogawa | ............. | H04L 12/2803 709/201 |
| 2006/0089134 A1* | 4/2006 | Moton, Jr. | ............. | H04L 41/12 455/418 |
| 2007/0146160 A1 | 6/2007 | Takeshita | | |
| 2007/0239317 A1* | 10/2007 | Bogolea | ............. | B60H 1/0065 700/276 |
| 2008/0180228 A1* | 7/2008 | Wakefield | ............. | G01S 5/0252 340/4.62 |
| 2009/0127248 A1* | 5/2009 | Itou | ............. | H05B 6/062 219/489 |
| 2009/0150509 A1* | 6/2009 | Chang | ............. | G06F 1/3203 709/208 |
| 2009/0158758 A1* | 6/2009 | Eguchi | ............. | F24F 11/006 62/157 |
| 2010/0145479 A1* | 6/2010 | Griffiths | ............. | G01D 21/00 700/17 |
| 2010/0180209 A1* | 7/2010 | Yang | ............. | G06F 1/266 715/748 |
| 2011/0138202 A1* | 6/2011 | Inoue | ............. | G06Q 10/04 713/310 |
| 2011/0178644 A1* | 7/2011 | Picton | ............. | E03B 7/071 700/282 |
| 2011/0251807 A1* | 10/2011 | Rada | ............. | G01D 4/00 702/61 |
| 2012/0065802 A1* | 3/2012 | Seeber | ............. | G06F 1/3203 700/295 |
| 2012/0154870 A1* | 6/2012 | Ogushi | ............. | G06K 15/402 358/1.16 |
| 2012/0172027 A1* | 7/2012 | Partheesh | ............. | H04W 4/021 455/420 |
| 2012/0316688 A1* | 12/2012 | Boardman | ............. | H02J 13/0079 700/291 |
| 2013/0083059 A1* | 4/2013 | Hwang | ............. | G06F 11/323 345/629 |
| 2013/0110305 A1* | 5/2013 | Meyerhofer | ............. | G06Q 50/06 700/296 |
| 2013/0166965 A1* | 6/2013 | Brochu | ............. | A61H 33/00 714/48 |
| 2013/0268125 A1* | 10/2013 | Matsuoka | ............. | G05D 23/1905 700/276 |
| 2014/0023556 A1* | 1/2014 | Jiang | ............. | C01B 13/10 422/29 |

FOREIGN PATENT DOCUMENTS

| | | |
|---|---|---|
| JP | 2004-254163 | 9/2004 |
| JP | 2005-72807 | 3/2005 |
| JP | 2007-181068 | 7/2007 |
| JP | 2007-201687 | 8/2007 |
| JP | 2010-206786 | 9/2010 |

* cited by examiner

FIG. 7
(a)
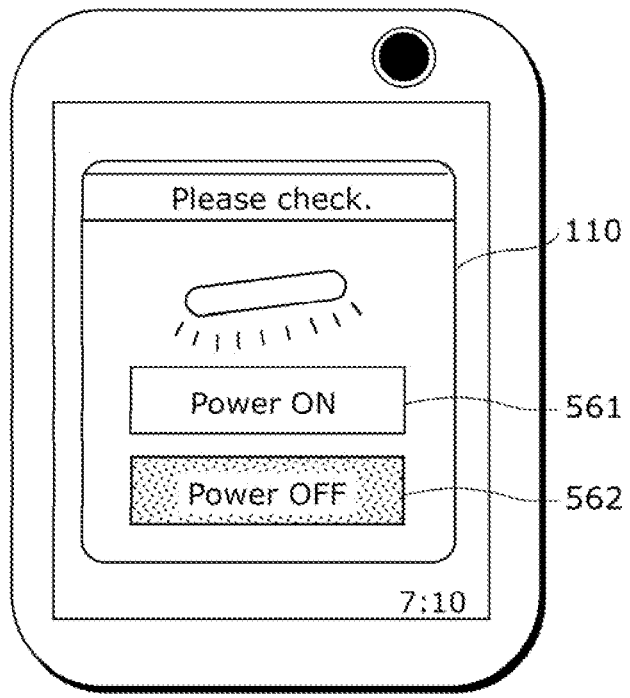
(b)
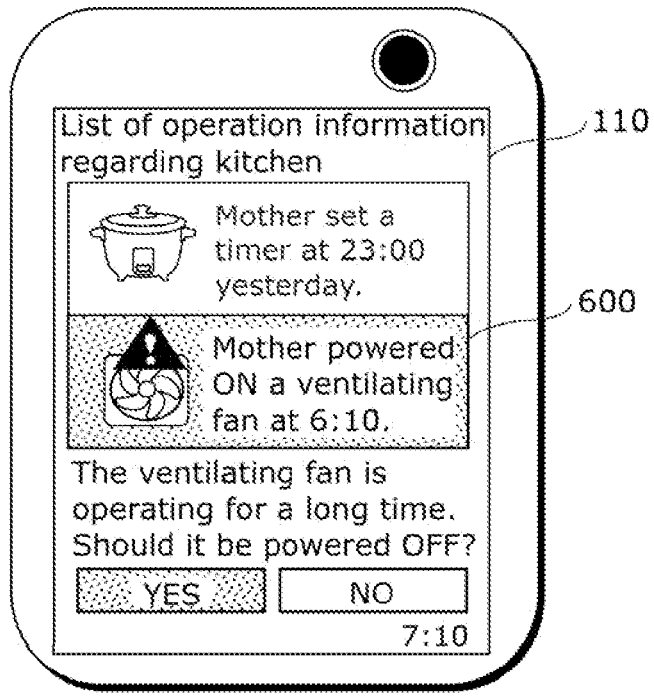

FIG. 9

| Apparatus ID | Apparatus type | Operation date/time | Operation information | Operator ID | Place information | Message text |
|---|---|---|---|---|---|---|
| ... | ... | ... | ... | ... | ... | ... |
| 10 | Microwave | 12/25 7:10 | Heating for [n] W [n] minutes | 1 | Kitchen | [Operator] is heating for [n] W [n] minutes. |
| 11 | Rice cooker | 12/24 23:00 | Timer has been ON since [date/time] | 2 | Kitchen | [Operator] powered ON a timer at [date/time]. |
| 12 | Ventilating fan | 12/25 6:10 | Powered ON at [date/time] | 2 | Kitchen | [Operator] powered ON at [date/time]. |
| 13 | Lighting apparatus | 12/25 6:00 | Powered ON at [date/time] | 2 | Kitchen | [Operator] powered ON at [date/time]. |
| 14 | Lighting apparatus | 12/25 7:00 | Powered ON at [date/time] | 2 | Living room | [Operator] powered ON at [date/time]. |
| 15 | TV | 12/25 7:30 | Watching [n] CH at [date/time] | 1 | Living room | [Operator] has been watching [n] CH since [time]. |
| 16 | Lighting apparatus | 12/24 23:40 | Powered OFF at [date/time] | 3 | Bedroom | [Operator] powered OFF at [date/time]. |
| ... | ... | ... | ... | ... | ... | ... |

Columns: G102 G103 G104 G105 G106 G107 G108 — Table G101

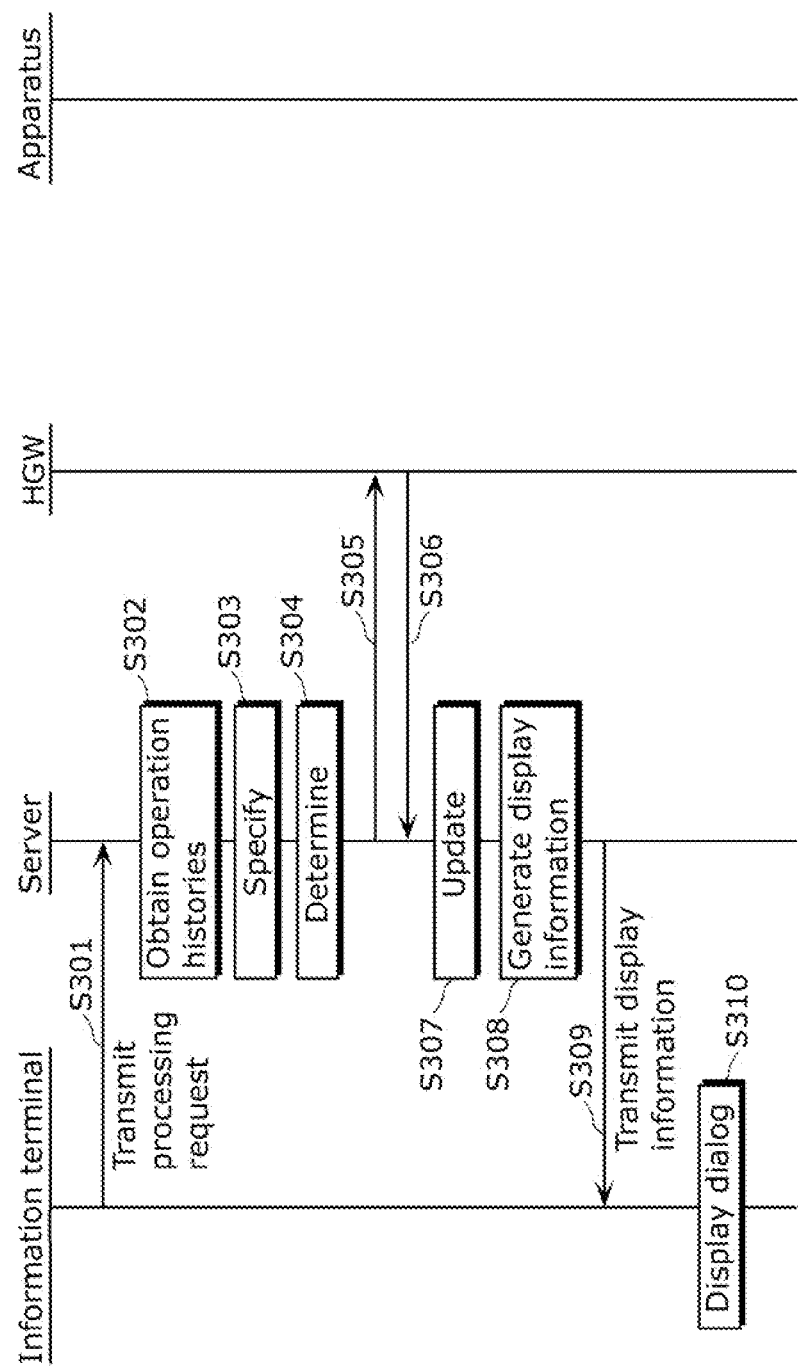

FIG. 11

| Smartphone ID | Apparatus ID | Position information | | | |
|---|---|---|---|---|---|
| | | Positioning time | Latitude | North latitude, South latitude | Longitude | East longitude, West longitude |
| | | hhmmss | ddmm.mmm | N/S | dddmm.mmm | E/W |
| 1 | 1 | | | | | |

FIG. 12

| Smartphone ID | Holder | Adult |
|---|---|---|
| 1 | Father | 1 |
| 2 | Mother | 1 |
| 3 | Child 1 | 0 |
| 4 | Grandfather | 1 |

FIG. 13
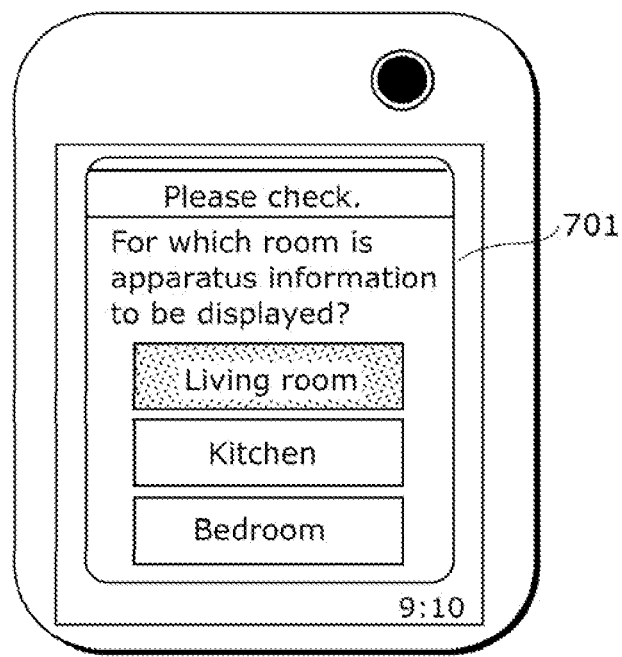
(a)
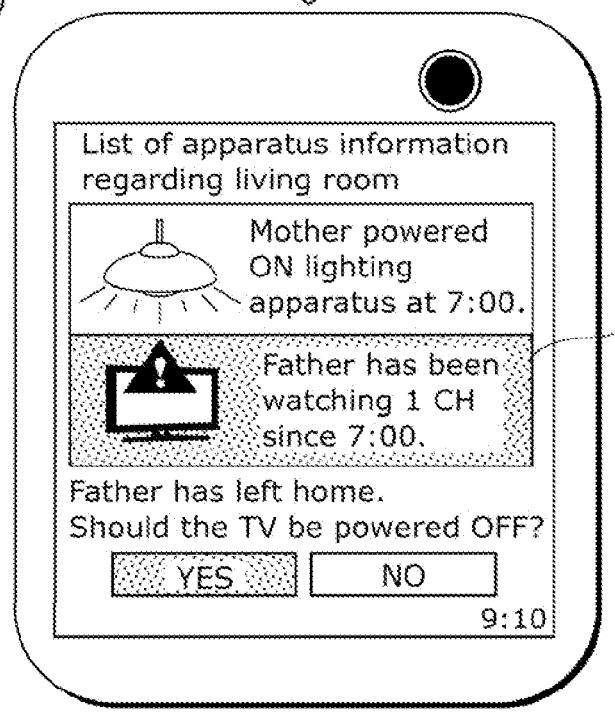
(b)

FIG. 14
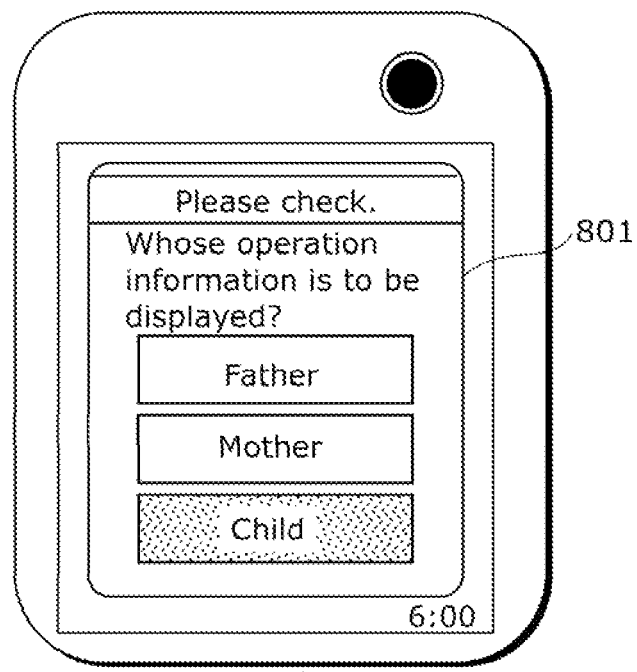
(a)
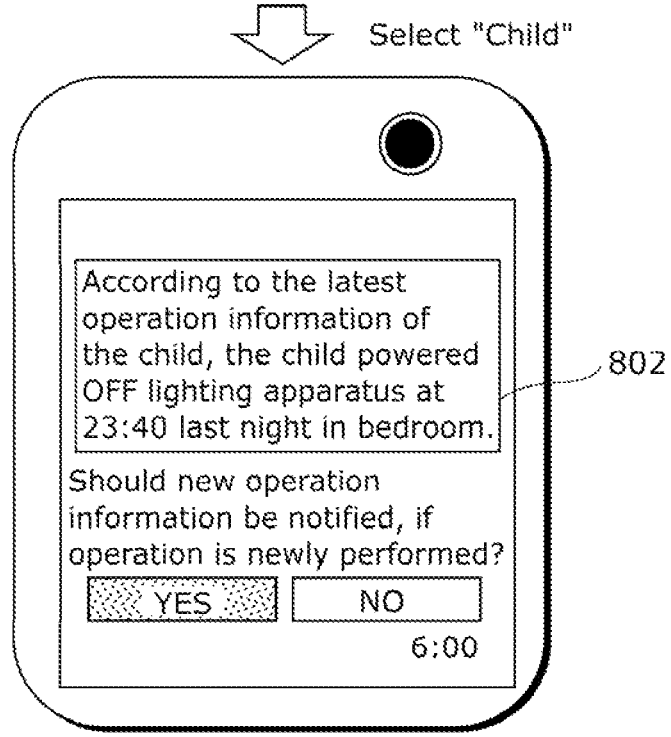
(b)

METHOD OF CONTROLLING A TARGET APPARATUS, SELECTED FROM A PLURALITY OF APPARATUSES BASED ON A SELECTION FROM DISPLAYED APPARATUS INFORMATION, PLACE INFORMATION, OR OPERATOR INFORMATION

TECHNICAL FIELD

The present invention relates to control methods used in remote control systems, for example a control method including: displaying candidate information on a user interface region of a display unit in an information terminal; obtaining, via a network, an operation history of each of apparatuses which indicates an operation performed on the corresponding apparatus; displaying, on the user interface region, a dialog for prompting a user to confirm whether or not to perform predetermined control on a target apparatus which is extracted according to at least one of (a) selected apparatus information (b) selected place information and (c) selected operator information, and has an operation history that satisfies a predetermined condition; generating a control signal for performing the predetermined control on the target apparatus, when the user confirms in the dialog that the predetermined control is to be performed on the target apparatus; and transmitting the control signal to the target apparatus via the network.

BACKGROUND ART

In recent years, with the development of network environments in home, not only information apparatuses, such as personal computers, but also home appliances, such as television sets (TVs), video recorders, air conditioners, and refrigerators, have been getting connected to a network. The network connection provides various types of usability to users. For example, users can control home appliances via a network.

For example, Patent Literature 1 (PTL 1) discloses a technique relating to an integrated controller capable of appropriately controlling apparatuses including home appliances.

CITATION LIST

[Patent Literature]
[PTL 1] Japanese Unexamined Patent Application Publication No. 2003-111157

SUMMARY OF INVENTION

Technical Problem

However, the conventional technologies as disclosed in PTL 1 are unable to confirm a state of an apparatus for which predetermined control is to be performed, thereby failing to appropriately control the apparatus.

In order to address the problem of the conventional technologies, an object of the present invention is to provide a control method of appropriately controlling a target apparatus according to a situation of the target apparatus by using an information terminal,

Solution to Problem

In accordance with an aspect of the present invention for achieving the object, there is provided a control method used in a remote control system including a plurality of apparatuses and an information terminal that controls at least one of the apparatuses via a network, the control method including: displaying, on a user interface region of a display unit in the information terminal, at least one of (a) pieces of apparatus information indicating apparatus candidates from which an apparatus is to be selected from the apparatuses, (b) pieces of place information indicating place candidates from which a place of at least one of the apparatuses is to be selected, and (c) pieces of operator information indicating operator candidates from which an operator who has operated at least one of the apparatuses is to be selected; obtaining an operation history of each of the apparatuses via the network, the operation history indicating an operation performed on the each of the apparatuses; displaying, on the user interface region, a dialog for prompting a user to confirm whether or not to perform predetermined control on a target apparatus, the target apparatus being extracted from the apparatuses according to at least one of (a) apparatus information selected from the pieces of the apparatus information, (b) place information selected from the pieces of the place information, and (c) operator information selected from the pieces of the operator information, and the target apparatus corresponding to the operation history that satisfies a predetermined condition; generating a control signal for performing the predetermined control on the target apparatus, when the user confirms in the dialog that the predetermined control is to be performed on the target apparatus; and transmitting the control signal to the target apparatus via the network.

These general and specific aspects may be implemented to a system, a method, an integrated circuit, a computer program, and a computer-readable recording medium, such as a Compact Disc-Read Only Memory (CD-ROM), and may be implemented also to a desired combination of them.

Advantageous Effects of Invention

The control method according to the present invention is capable of recommending next control to a user according to a situation of a target apparatus by using an information terminal.

BRIEF DESCRIPTION OF DRAWINGS

FIG. 7 is a diagram illustrating an example of a change of a smartphone display screen from a control menu to a dialog according to Example 1 of Embodiment.

FIG. 9 is an example of an operation history table according to Example 1 of Embodiment.

FIG. 10 is a chart for explaining dialog display processing according to Example 1 of Embodiment.

FIG. 11 is a table indicating details of information transmitted from a remote control application to a server according to Example 1 of Embodiment.

FIG. 12 is an example of a user information table registered in a database in the server according to Example 1 of Embodiment.

FIG. 13 is a diagram illustrating an example of a change of a smartphone display screen to a dialog according to Example 2 of Embodiment.

FIG. 14 is a diagram illustrating an example of a change of a smartphone display screen to a dialog according to Example 3 of Embodiment.

Figure 1:
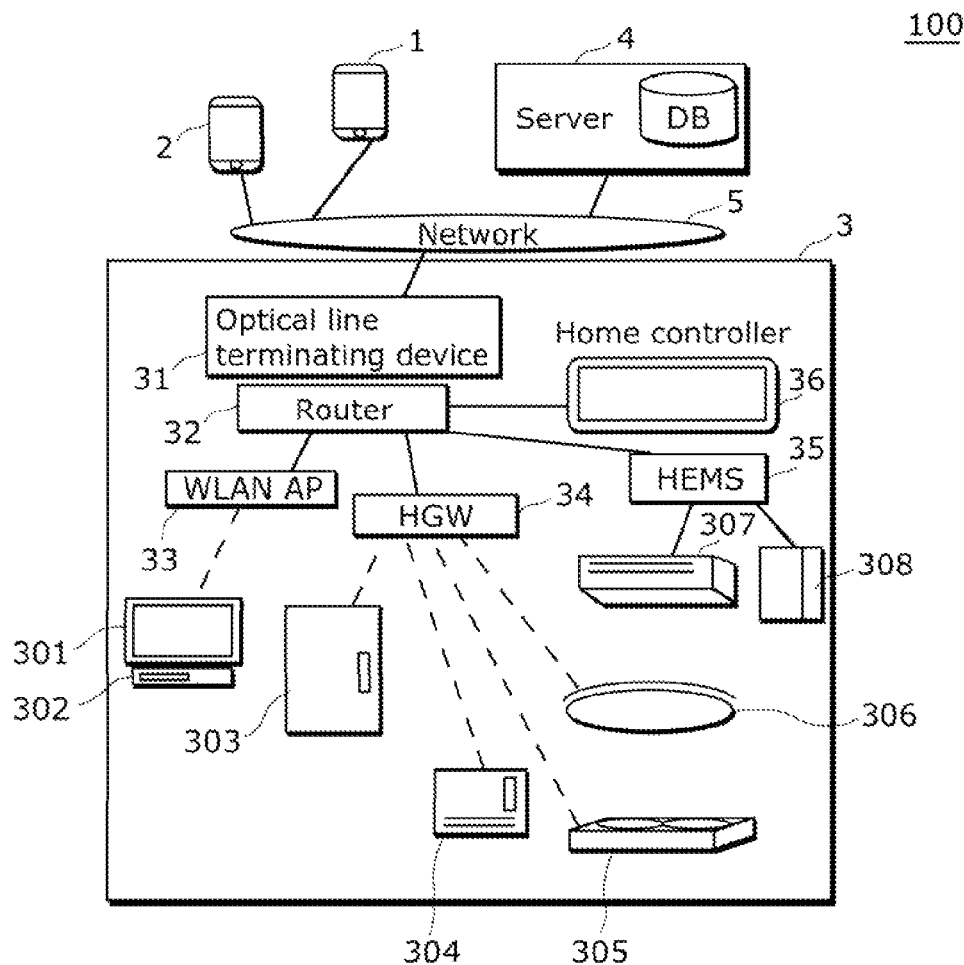
FIG. 1 is a diagram illustrating an example of an overall configuration of a remote control system according to Embodiment.

DESCRIPTION OF EMBODIMENT (Observation Based on which Present Invention is Conceived)

The conventional techniques as disclosed in PTL 1 have a problem, for example, of a failure of appropriate control on a target apparatus to be controlled by a user.

More specifically, if one of home appliances is to be controlled (hereinafter, such a home appliance is referred to also as a "target apparatus"), the target apparatus and an operation to be performed on the target apparatus vary depending on various situations, for example, depending on an "operator (who)", a "time of operation (when)", a "place for operation (at where)", the "apparatus to be operated (what)", and a "place where the apparatus is set (to where)" (i.e., where the apparatus is located". For example, if power of a certain apparatus has been ON for long hours, a user probably wants to power OFF the apparatus. The user therefore has to bother to check which apparatus has been ON for long hours.

In order to address the above problem, an object of the present invention is to provide a control method of appropriately controlling a target apparatus according to a situation of the target apparatus by using an information terminal.

In accordance with an aspect of the present invention for achieving the object, there is provided a control method used in a remote control system including a plurality of apparatuses and an information terminal that controls at least one of the apparatuses via a network, the control method including: displaying, on a user interface region of a display unit in the information terminal, at least one of (a) pieces of apparatus information indicating apparatus candidates from which an apparatus is to be selected from the apparatuses, (b) pieces of place information indicating place candidates from which a place of at least one of the apparatuses is to be selected, and (c) pieces of operator information indicating operator candidates from which an operator who has operated at least one of the apparatuses is to be selected; obtaining an operation history of each of the apparatuses via the network, the operation history indicating an operation performed on the each of the apparatuses; displaying, on the user interface region, a dialog for prompting a user to confirm whether or not to perform predetermined control on a target apparatus, the target apparatus being extracted from the apparatuses according to at least one of (a) apparatus information selected from the pieces of the apparatus information, (b) place information selected from the pieces of the place information, and (c) operator information selected from the pieces of the operator information, and the target apparatus corresponding to the operation history that satisfies a predetermined condition; generating a control signal for performing the predetermined control on the target apparatus, when the user confirms in the dialog that the predetermined control is to be performed on the target apparatus; and transmitting the control signal to the target apparatus via the network.

It is therefore possible to provide a control method of recommending next control to the user according to a situation of the target apparatus by using the information terminal.

For example, it is possible that in the operation history, the operation performed on the each of the apparatuses is associated in a time of performing the operation, the predetermined condition is a condition that (a) a latest operation history of the target apparatus among operation histories including the operation history indicates that the target apparatus has been operated to be powered ON, and (b) a predetermined time period has passed since a time of performing the operation indicated in the latest operation history, and in the displaying of the dialog, the dialog prompts the user to confirm whether or not to perform control as the predetermined control on an apparatus that is the target apparatus satisfying the condition, the control being control for powering OFF the apparatus.

For example, it is also possible that in the operation history, the operation performed on the each of the apparatuses is associated with a time of performing the operation, the predetermined condition is a condition that (a) a latest operation history of the target apparatus among operation histories including the operation history indicates that the target apparatus has been operated to be powered ON, (b) a predetermined time period has passed since a time of performing the operation indicated in the latest operation history, and (c) the user is not in a place where the target apparatus is located, and in the displaying of the dialog, the dialog prompts the user to confirm whether or not to perform control as the predetermined control on an apparatus that is the target apparatus satisfying the condition, the control being control for powering OFF the apparatus.

For example, it is further possible that in the operation history, the each of the apparatuses is further associated with an operator who has performed the operation, the condition further includes a condition that the target apparatus to be extracted is in a place different from a place where an operator who has performed a latest operation indicated in the operation history on the target apparatus is present, and the control method further comprises determining whether or not the operator who has performed the latest operation on the target apparatus is in the place where the target apparatus is located, wherein in the displaying of the dialog, the dialog prompts the user to confirm whether or not to perform the control on the apparatus as the target apparatus, the apparatus being extracted from the apparatuses according to at least one of (a) apparatus information selected from the pieces of the apparatus information, (b) place information selected from the pieces of the place information, and (c) operator information selected from the pieces of the operator information, and the apparatus corresponding to the operation history and a result of the determining both of which satisfy the condition.

For example, it is still further possible that in the displaying of the dialog, information indicating the target apparatus that satisfies the predetermined condition is displayed with the dialog in a display mode indicating that the target apparatus satisfies the condition.

For example, it is still further possible that the displaying of the dialog further includes displaying, on the user interface region of the display unit in the information terminal, a dialog for prompting the user to confirm whether or not to extract the operation history indicating the operation performed on the target apparatus, the target apparatus being extracted from the apparatuses according to at least one of (a) apparatus information selected from the pieces of the apparatus information, (b) place information selected from the pieces of the place information, and (c) operator information selected from the pieces of the operator information, and the control method further comprises when the user confirms in the dialog that the operation history indicating the operation performed on the target apparatus is to be extracted, (i) extracting the operation history, and (ii) displaying the extracted operation history on the user interface region.

These general and specific aspects may be implemented to a system, a method, an integrated circuit, a computer program, and a computer-readable recording medium, such as a CD-ROM, and may be implemented also to a desired combination of them.

The following describes a control method used in a remote control system according to an Embodiment of the present invention with reference to the Drawings.

It should be noted that Embodiment described below a specific example of the present invention. Numerical values, shapes, materials, constituent elements, arrangement positions and the connection configuration of the constituent elements, steps, the order of the steps, and the like described in the following Embodiment is merely an example, and is not intended to limit the present invention. Among the constituent elements in the following Embodiment, constituent elements that are not described in independent claims that show the most generic concept of the present invention are described as elements constituting more desirable configurations.

Embodiment

1. Configuration of Remote Control System

The following describes a remote control system 100 according to Embodiment, with reference to the Drawings.

1.1 Overall Configuration of Remote Control System

FIG. 1 is a diagram illustrating an example of an overall configuration of a remote control system according to Embodiment.

A remote control system 100 illustrated in FIG. 1 includes: a plurality of apparatuses; and information terminals each of which controls at least one of the apparatuses as a target apparatus via a network 5. In Embodiment, the remote control system 100 includes an information terminal 1, an information terminal 2, apparatuses to be controlled in home 3, and a server 4, all of which are connected to one another via the network 5.

The information terminals 1 and 2 are portable devices, such as smartphones and tablets, each of which has a display unit with a touch panel function. In the following description, the information terminals 1 and 2 are not limited to the above examples. The information terminals may be any kind of terminals capable of connecting the apparatuses in the home 3 to the server 4 via the network 5. In Embodiment, the information terminals 1 and 2 are described as smartphones.

In the home 3 illustrated in FIG. 1, there are various devices, such as an optical line terminating device 31, a router 32, a Wireless Local Area Network Access Point (WLAN AP) 33, a Home GateWay (HGW) 34, a Home Energy Management System (HEMS) 35, a home controller 36, apparatuses to be controlled (hereinafter, referred to simply as an "apparatus", or represented as an "apparatus 300") and the like.

The apparatus 300 is a home appliance, such as a TV 301, a Blu-ray® Disc (BD) recorder 302, a door intercom 303, a heating appliance 304 such as a kotatsu (Japanese heating appliance), an Induction Heating (IT) cooking heater 305, a lighting apparatus 306, an air conditioner 307, or a water heater 308.

The apparatus 300 is connectable to the server 4 via the HGW 34 on the network. In response to a processing request notified from the HGW 34, the apparatus 300 performs requested predetermined processing and notifies a result of the processing to the HGW 34.

The HGW 34 has a function of notifying the processing request provided from the server 4 to the apparatus 300 in the home 3, and notifying the server 4 of information obtained from the apparatus 300, the result of the processing, and the like.

Figure 2:
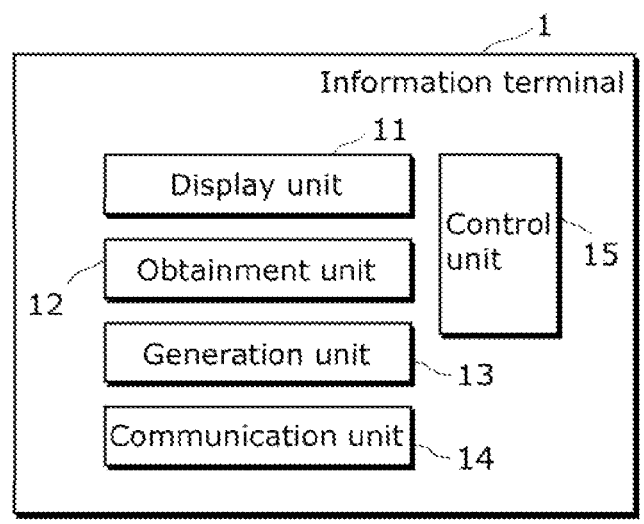
FIG. 2 is a block diagram illustrating an example of a structure of an information terminal according to Embodiment.

The network 5 may be a local area network or a wide area network such as the Internet. In Embodiment, the network 5 is described as the Internet, 1.2 Structure of Information Terminal FIG. 2 is a block diagram illustrating an example of a structure of the information terminal according to Embodiment.

The information terminal 1 has a function of serving as a remote controller that requests the apparatus 300 to perform processing. The information terminal 1 (hereinafter, referred to also as a "smartphone") has a device ID. The information terminal 1 is capable of determining a current position of the information terminal 1 by the Global Positioning System (GPS), and has a function of transmitting the position information to the server 4. When the information terminal 1 is to request the apparatus 300 to perform processing, the information terminal 1 notifies the apparatus 300 of the device ID and the current position information of the information terminal 1 as well as details of the control. By operating the information terminal 1, for example, a user (operator of the Information terminal 1) is able to operate (control) the apparatus 300 from outside of the home. For example, the user can reserve recording outside the home when the user has forgotten to reserve it, or power OFF a kotatsu outside the home when the user has forgotten to power it OFF.

The following describes the above in more detail. As illustrated in FIG. 2, the information terminal 1 includes a display unit 11, an obtainment unit 12, a generation unit 13, a communication unit 14, and a control unit 15.

Examples of the display unit 11 are a touch display and the like. The display unit 11 has a user interface region on which at least touch inputting is possible. The display unit 11 is controlled by the control unit 15. More specifically, on a display screen including the user interface region, the display unit 11 displays pieces of candidate information, a dialog, and the like in a display mode determined by the control unit 15. The pieces of candidate information is at least one of (a) a set of pieces of apparatus information, (b) a set of pieces of place information, and (c) a set of pieces of operator information. The dialog is displaying of recommendation of a next action (operation) to the user.

The obtainment unit 12 obtains an operation history of each of the apparatuses via the network 5. The operation history indicates an operation performed on a corresponding apparatus.

The control unit 15 causes a user interface region of the display unit 11 in the information terminal 1 to display at least one of (a) pieces of apparatus information indicating apparatus candidates from which an apparatus 300 is to be selected from the apparatuses, (b) pieces of place information indicating place candidates from which a place of at least one of the apparatuses is to be selected, and (c) pieces of operator information indicating operator candidates from which an operator who has operated at least one of the apparatuses is to be selected. Furthermore, the control unit 15 causes the user interface region of the display unit 11 in the information terminal 1 to display a dialog for prompting a user to confirm whether or not to perform predetermined control on a target apparatus. Here, the target apparatus is extracted from the apparatuses according to at least one of (a) apparatus information selected from the pieces of the apparatus information, (b) place information selected from the pieces of the place information, and (c) operator information selected from the pieces of the operator information, and the target apparatus corresponds to the operation history that satisfies a predetermined condition.

The generation unit 13 generates a control signal for performing the predetermined control on the target apparatus 300, when the user confirms, in the dialog, displayed on the user interface region of the display unit 11 in the information terminal 13, that the predetermined control is to be performed on the target apparatus.

The communication unit transmits the control signal generated by the generation unit 13 to the apparatus satisfying the predetermined condition (the target apparatus 300) via the network 5.

Here, for example, it possible that in the operation history, the operation performed on the each of the apparatuses is associated in a time of performing the operation. It is also possible that the predetermined condition is a first condition that (a) the latest operation history of the target apparatus among operation histories indicates that the target apparatus has been operated to be powered ON, and (b) a predetermined time period has passed since a time of performing the operation indicated in the latest operation history. In this case, for example, it is possible that the control unit 15 causes displaying of the dialog for prompting the user to confirm whether or not to perform first control as the predetermined control on a first apparatus that is the target apparatus satisfying the first condition. Here, the first control is control for powering OFF the first apparatus Furthermore, for example, it is possible that in the operation history, the operation performed on the each of the apparatuses is associated with a time of performing the operation. It is also possible that the predetermined condition is a first condition that (a) the latest operation history of the target apparatus among operation histories indicates that the target apparatus has been operated to be powered ON, (b) a predetermined time period has passed since a time of performing the operation indicated in the latest operation history, and (c) the user is not in a place where the target apparatus is located. In this case, for example, it is possible that the control unit 15 causes displaying of the dialog for prompting the user to confirm whether or not to perform first control as the predetermined control on a first apparatus that is the target apparatus satisfying the first condition. Here, the first control is control for powering OFF the first apparatus.

Moreover, for example, it is possible that in the operation history, the each of the apparatuses is further associated with an operator who has performed the operation. It is also possible that the first condition further includes a condition that the target apparatus to be extracted is in a place different from a place where an operator who has performed a latest operation indicated in the operation history on the target apparatus is present. In this case, for example, it is possible that the control unit 15 determines whether or not the operator who has performed the latest operation on the target apparatus is in the place where the target apparatus is located. For example, it is possible that the control unit 15 causes displaying of the dialog for prompting the user to confirm whether or not to perform the first control on the first apparatus as the target apparatus. Here, the first apparatus is extracted from the apparatuses according to at least one of (a) apparatus information selected from the pieces of the apparatus information, (b) place information selected from the pieces of the place information, and (c) operator information selected from the pieces of the operator information. The first apparatus corresponds to the operation history and a result of the determining both of which satisfy the first condition.

Still further, for example, it is possible that the control unit 15 causes displaying of information indicating the target apparatus satisfying the predetermined condition together with the dialog in a display mode indicating that the target apparatus satisfies the first condition.

Still further, for example, it is possible that the control unit 15 associates, based on the operation histories, operations which have been performed on a plurality of apparatuses at the same place in the same time period with one another so as to belong to the same operation group. In this case, the predetermined condition may be a second condition that a second apparatus is extracted when one of the associated operations in the operation group is operated. The second apparatus corresponds to an operation that is in the operation group and has not yet been performed. Furthermore, in this case, for example, the control unit 15 may cause the second apparatus that satisfies the second condition to display, as the dialog, a dialog for prompting the user to confirm whether or not to perform, according to the second control as the predetermined control, the operation that has not yet been performed. Moreover, in this case, the generation unit 13 may generate a control signal for causing the second apparatus to perform the operation according to the second control, when the user confirms, in the dialog displayed on the user interface region of the display unit 11 in the information terminal 1, that the second control is to be performed on the second apparatus. In this case, the communication unit 14 may transmit the control signal generated by the generation unit 13 to the second apparatus via the network 5.

Furthermore, for example, the control unit 15 may cause the user interface region of the display unit 11 in the information terminal 1 to display a dialog for prompting the user to confirm whether or not to extract an operation history of an operation performed on an apparatus extracted from the plurality of apparatuses based on at least one of the selected apparatus information, the selected place information, and the selected operation information. Then, in this case, for example, when the user confirms that the operation history of the operation performed on an apparatus extracted in the dialog displayed on the user interface region of the display unit 11 in the information terminal 1 is to be extracted, the control unit may extract the operation history of the operation performed on the extracted apparatus and cause the user interface region of the display unit 11 in the information terminal 1 to display the extracted operation history.

1.3 Structure of Server

Figure 3:
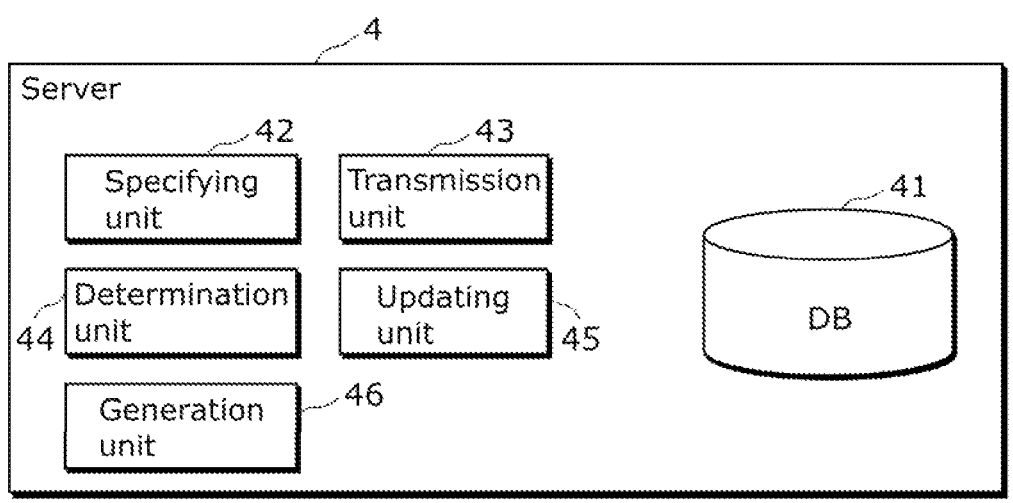
FIG. 3 is a block diagram illustrating an example of a structure of a server according to Embodiment.

FIG. 3 is a block diagram illustrating an example of a structure of the server according to Embodiment.

The server 4 receives a processing request from the information terminal 1, for example, and performs processing requested in the processing request. In addition, the server 4 performs processing for inquiring the HGW 34 about information necessary to perform the requested processing. The server 4 notifies, the processing request to a corresponding apparatus 300 via the HGW 34.

The server 4 includes a database (DB) 41, a specifying unit 42, a transmission unit 43, a determination unit 44, an updating unit 45, and a generation unit 46.

In the DB 41, there are registered various pieces of information and the like regarding each of the apparatuses, such as a type, an apparatus ID, a function, and an owner (private owner or co-owners) of the apparatus. Since the apparatuses have respective different functions (providabie functions), the registered pieces of information also differ depending on the apparatuses. For example, a kotatsu has functions of power ON and OFF, and the like, while a BD recorder has functions of power ON and OFF, reproduction, fast-forward, recording, reservation, and the like.

The specifying unit 42 specifies, based on a device ID, a holder (operator) of the information terminal 1 (smartphone) that has issued a processing request.

The determination unit 44 determines, based on current position information of the operator and registered position information of the home, whether the information terminal 1 (smartphone) that has issued the processing request is in the home 3 or outside the home 3.

The transmission unit 43 transmits an interface corresponding to an attribute of the specified holder (operator), the current position of the information terminal 1 (smartphone), an attribute of an apparatus to be controlled, and a function of the apparatus. In short, the transmission unit 43 can provide an interface according to the situation of the control unit 15 of the information terminal 1.

1.4 Operations of Remote Control System

Next, operations of the remote control system 100 having the above-described configuration are described.

Figure 4:
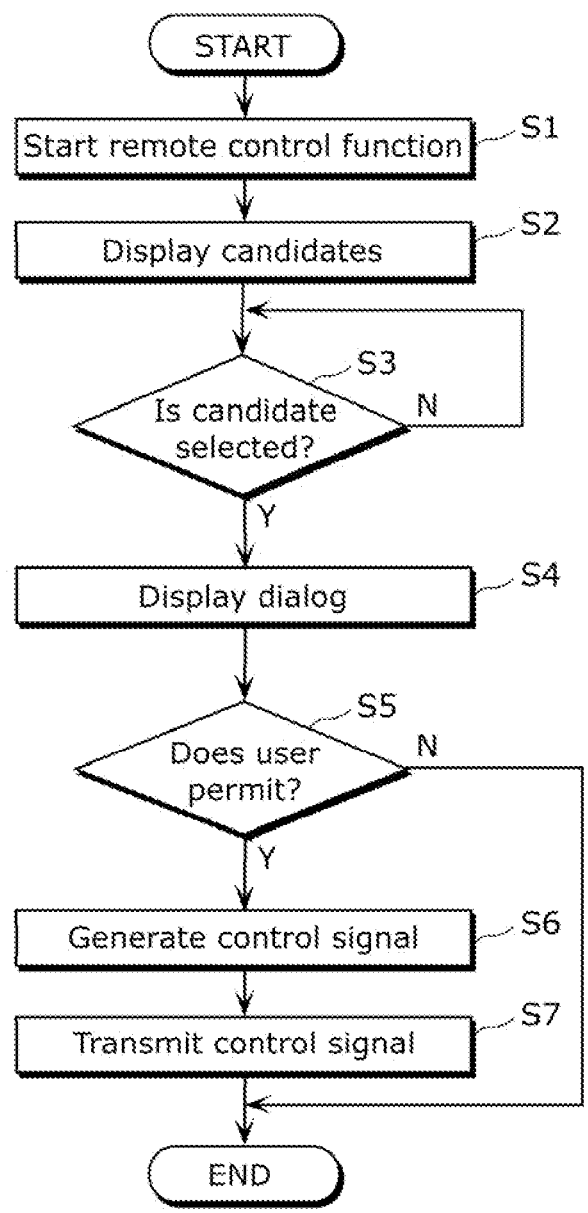
FIG. 4 is a flowchart of a control method performed in the remote control system according to Embodiment.

FIG. 4 is a flowchart of a control method performed by the remote control system according to Embodiment.

First, the user starts a remote control function of the information terminal 1 (S1). Here, for example, it is assumed that a function of the information terminal 1 (smartphone) for serving as a remote controller (remote control function) is executed by an application (remote control application) installed in the information terminal 1.

Next, the remote control system 100 displays, on a user interface region of the display unit 11 in the information terminal 1, at least one of (a) pieces of apparatus information indicating apparatus candidates from which an apparatus is to be selected from the apparatuses, (b) pieces of place information indicating place candidates from which a place of at least one of the apparatuses is to be selected, and (c) pieces of operator information indicating operator candidates from which an operator who has operated at least one of the apparatuses is to be selected (S2). Then, the remote control system 100 obtains an operation history of each of the apparatuses via the network. The operation history indicates an operation performed on the each of the apparatuses.

In Embodiment, the remote control system 100 causes the user interface region of the display unit 11 in the information terminal 1 to display candidates of a target apparatus 300 to be controlled among the plurality of apparatuses.

Next, it is determined, based on a touch input or the like of the operator of the information terminal 1, whether or not at least one of the pieces of apparatus information, place information, or operator information is selected (S3).

If at least one of the pieces of apparatus information, place information, or operator information is selected (Y at S3), then the remote control system 100 displays a dialog for prompting the user to confirm whether or not to perform predetermined control on an apparatus (namely, a target apparatus) which is extracted based on the selected information and has an operation history satisfying a predetermined condition (S4). On the other hand, if it is not determined at S3 that at least one of the pieces of apparatus information, place information, or the operator information is selected (N at S3), then the processing returns to S3 to perform the same processing.

Next, it is determined, based on a touch input or the like of the operator of the information terminal 1, whether or not the user has confirmed a dialog (S5). More specifically, the remote control system 100 determines, based on a touch input or the like of the operator of the information terminal 1, whether or not the user permits, in the dialog displayed on the user interface region of the display unit 11 in the information terminal 1 to perform predetermined control on the target apparatus satisfying the predetermined condition.

Next, if the user permits the predetermined control on the target apparatus in the dialog (Y at S5), then the remote control system 100 generates a control signal (S6). More specifically, if "YES" is selected in the dialog (Y at S5), then the generation unit 13 of the information terminal 1 generates a control signal for causing the target apparatus satisfying the predetermined condition to perform processing according to the predetermined control. Here, the control signal corresponds to the above-described processing request. On the other hand, at S5, if the user does not permit the predetermined control on the target apparatus in the dialog (N at S5), then the processing is ended.

Next, the remote control system 100 transmits the control signal to the target apparatus via the network 5 (S7). More specifically, the communication unit 14 of the information terminal 1 transmits the control signal (processing request) generated by the generation unit 13 to the server 4. The server 4 transmits the received control signal (processing request) to the target apparatus 300 (apparatus satisfying the predetermined condition) via the HGW 34.

1.5 Example 1

Figure 5:
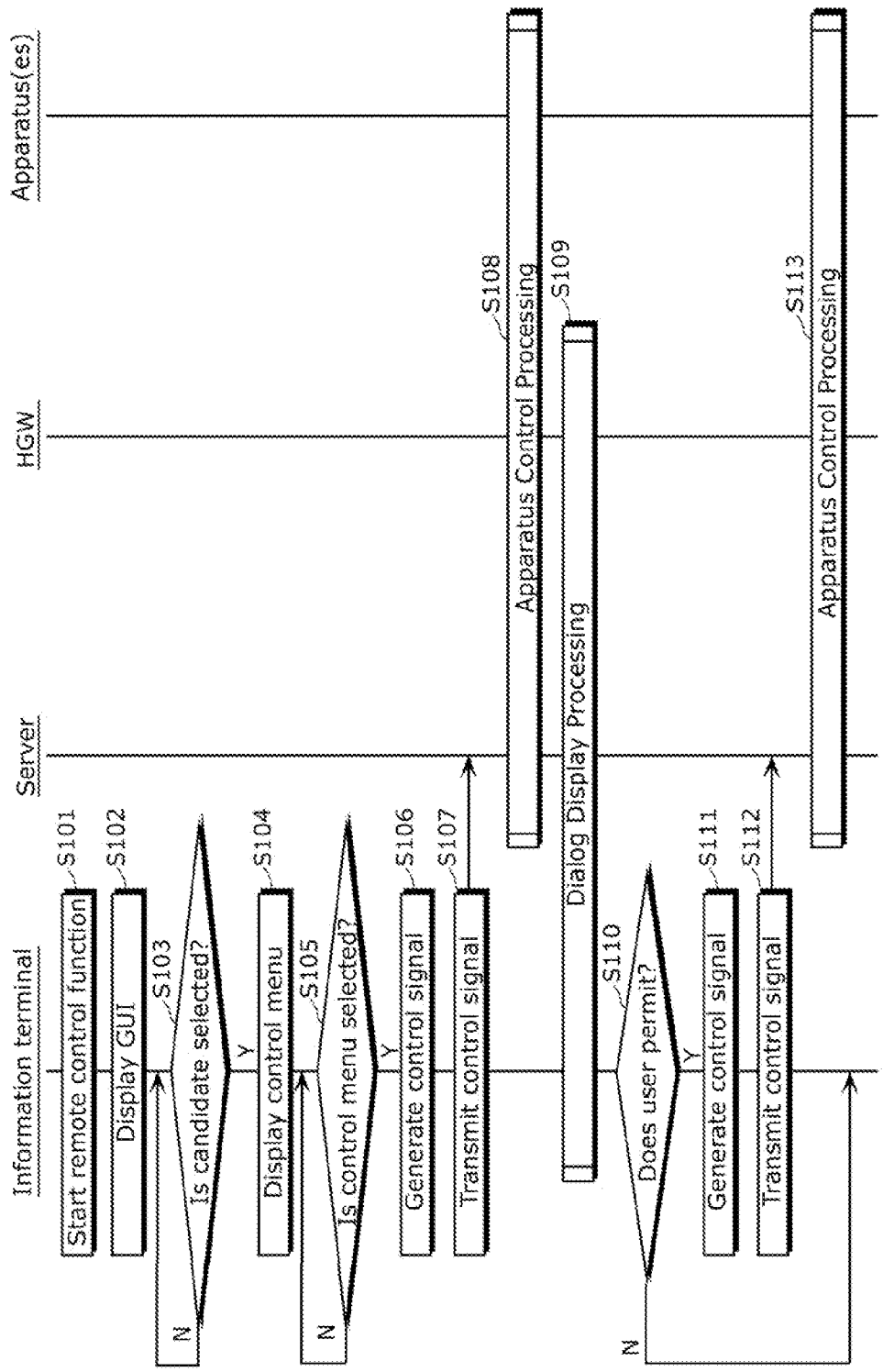
FIG. 5 is a time chart of an example of processing performed in the remote control system according to Example 1 of Embodiment.

The following describes, as Example 1, an example of the remote control on a target apparatus by the remote control system 100 operating as above, with reference to a time chart illustrated in FIG. 5.

FIG. 5 is a time chart illustrating an example of processing performed by the remote control system according to Example 1 of Embodiment.

Here, a function of the smartphone (information terminal 1) for serving as a remote controller is assumed to be executed by a remote control application installed in the smartphone in the same manner as described previously.

First, an operator (hereinafter, referred to as a "user") of the smartphone (information terminal 1) starts the remote control application (S101).

Figure 6:
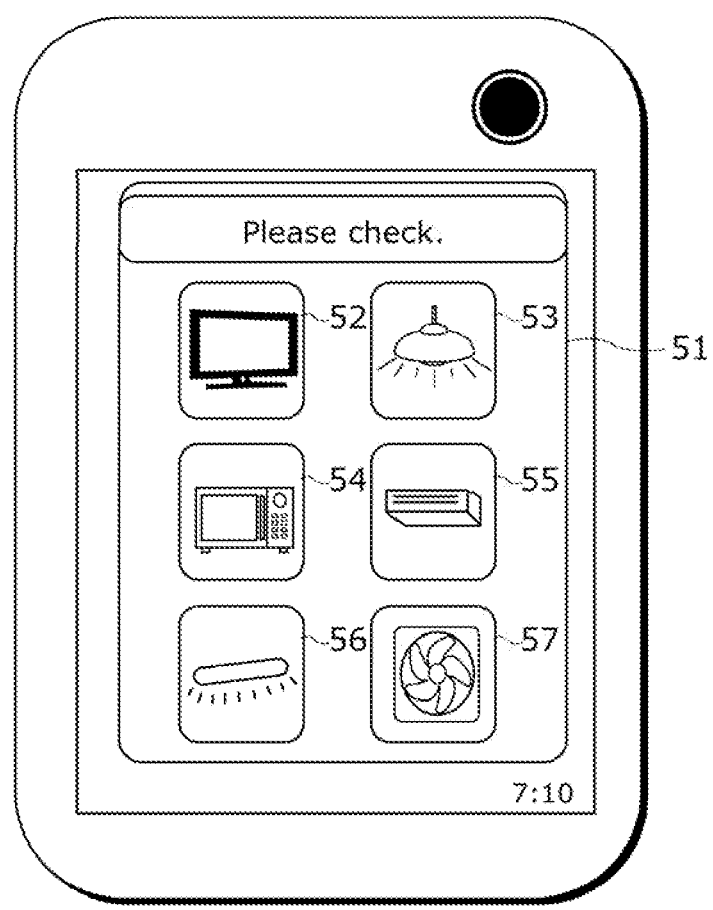
FIG. 6 is a diagram illustrating an example of a Graphical User Interface (GUI) on a display screen of a smartphone according to Example 1 of Embodiment.

Then, the remote control application displays a Graphical User Interface (GUI) of the remote control application on a display screen 110 illustrated in FIG. 6 (S102).

FIG. 6 is a diagram illustrating an example of the GUI of the remote control application which is displayed on the display screen of the smartphone according to Example 1 of Embodiment. The display screen 110 illustrated in FIG. 6 corresponds to the user interface region of the display unit 11. The user can perform touch inputting on the display screen 110. In the example illustrated in. FIG. 6, as pieces of apparatus information indicating candidates from which an apparatus to be controlled is selected, there are displayed an icon 52 of a TV, an icon 53 of a dining lighting apparatus, an icon 54 of a microwave, an icon 55 of a air conditioner, an icon 56 of a kitchen lighting apparatus, and an icon 57 of a BD recorder. If the kitchen lighting apparatus is to be controlled, the user taps (touch-inputs) the icon 56 of the kitchen lighting apparatus to select the kitchen lighting apparatus as the apparatus to be controlled. Here, the remote control application determines whether or not any one of the pieces of the apparatus information is selected (S103).

Next, if the icon 56 of the kitchen lighting apparatus is selected as an apparatus to be controlled (Y at S103), then the remote control application displays a control menu for controlling the kitchen lighting apparatus, as illustrated in FIG. 7, for example (S104). Here, FIG. 7 is a diagram illustrating an example of the situation where the control menu is changed to a dialog on the display screen of the smartphone according to Example 1 of Embodiment. As illustrated in (a) in FIG. 7, the remote control application displays a Power ON button 561 and a Power OFF button 562 as items in the control menu on the display screen 110 displayed on the display unit 11. On the other hand, if any of the pieces of the apparatus information is not selected (N at S103), then Step S103 is repeated.

Then, the remote control application determines whether or not any item in the control menu is selected (S105).

Here, if the user of the smartphone taps (touch-inputs) the Power OFF button 561 displayed on the display screen 110 (user interface region) (Y at S105), then a control signal for causing the kitchen lighting apparatus to perform processing according to the control indicated by the Power OFF button 561 is generated (S106). Then, the remote control application notifies (transmits) the generated control signal to the server 4 via the network 5 (S107). When the remote control application transmits the control signal to the server 4, the remote control system performs: apparatus control processing (S108) for causing the apparatus to be controlled to perform processing according to the control indicated by the control signal; and dialog display processing (S109) for displaying a dialog. Although the apparatus control processing and the dialog display processing are performed in this order in FIG. 5 for the sake of convenience of the explanation, it is also possible to perform them in parallel or in reverse order.

Figure 8:
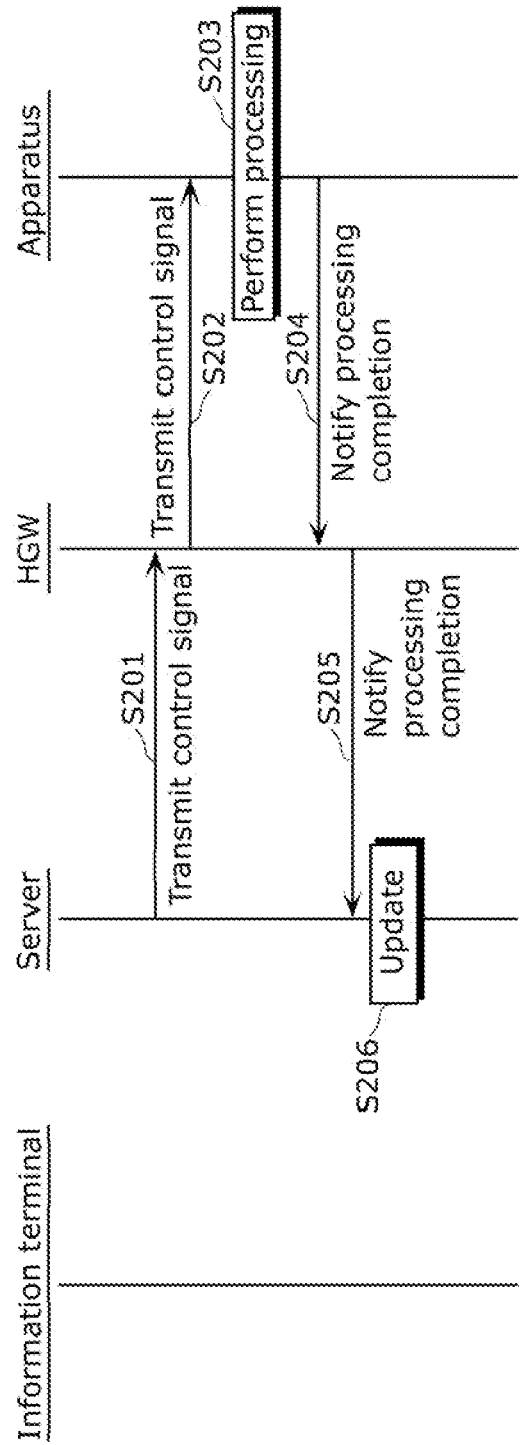
FIG. 8 is a chart for explaining processing of controlling an apparatus according to Example 1 of Embodiment.

FIG. 8 is a chart for explaining the apparatus control processing (S108) according to Example 1 of Embodiment.

In the apparatus control processing at Step S108, first, the server 4 instructs, via the HGW 34, the apparatus to be controlled to perform the processing indicated by the control signal notified from the remote control application (S201, S202). At Step S108, since the apparatus to be controlled is the kitchen lighting apparatus, the server 4 instructs the kitchen lighting apparatus to be powered OFF as indicated by the control signal.

The apparatus receiving the control signal performs the instructed processing (S203), and notifies the server 4 via the HGW that the processing is completed (S204, S205). It should be noted that it has been described that the apparatus receives the control signal, but the present invention is not limited to the above. The apparatus may receive, from the server 4, only a signal for requesting execution of the processing based on the control signal. In this case, the apparatus may perform the processing based on the signal.

Finally, from the apparatus via the HGW 34, the server 4 receives the notification indicating that the processing is completed, and then updates information of a current state of the apparatus (S206). More specifically, in the updating processing, the server 4 updates items of an operation date/time G104, operation information G105, an operator G106, and a place G107 which are registered in a dialog table illustrated in FIG. 9 in association with the "kitchen lighting apparatus", to information depending on the performed control.

FIG. 9 illustrates an example of an operation history table according to Example 1 of Embodiment.

The operation history table G101 illustrated in FIG. 9 is a table in which an apparatus type G103, an apparatus ID G102, an operation date/time G104, operation information G105, an operator ID G106, place information G107, and a message text G108 are stored in association with one another for each of the apparatuses. The apparatus type G103 indicates a microwave, a rice cooker, a ventilating fan, a lighting apparatus, a TV, a refrigerator, or the like. The apparatus ID G102 is used to identify the apparatus type. The operation date/time G104 indicates the latest time of operating the apparatus. The operation information G105 indicates the latest operation performed on the apparatus according to the control. The operator ID G106 is used to identify an operator who performs the operation corresponding to the operation information. The place information G107 indicates a place (in other words, a setting place of the apparatus) where the apparatus performs the processing according to the control corresponding to the operation information. The message text G108 is used when displaying a dialog of the remote control application. The operation history table G101 is managed by the server 4. In other words, the operation history table G101 is stored in the DB 41 of the server 4.

The operation information G105 indicates details of an operation which the operator has been performed on the corresponding apparatus. Although it has been described in Embodiment that the operation information indicates the latest information, the operation information may indicate not only the latest information but also pieces of past information. Furthermore, although it has been described that the operation information G105 indicates an operation performed on the apparatus according to the control, the present invention is not limited to the above. The operation information G105 may indicate pieces of trouble information.

The message text G108 is generated based on the apparatus type G103, the operator ID G106, the operation time 6104, and the operation information G105. The message text G108 indicates a text to be displayed in a dialog of the remote control application. More specifically, the DB 41 of the server 4 further stores message information in which, for example, a combination of the apparatus type G103, the operator ID G106, the operation time G104, and the operation information G105 is associated with a message text that is predetermined for the combination. With reference to the message information, the server 4 specifies a message text associated with a combination of the apparatus type G103, the operator ID G106, the operation time G104, and the operation information G105, and stores the specified message text to the message text G108.

It should be noted that, in the operation history table, the operation information is associated with an operator who has performed the operation indicated in the operation information. Therefore, the operator can be specified. An example of a method for specifying an operator is a method using the remote control system by the information terminal 1. Furthermore, as another example of the method for specifying an operator, it is also possible that an Near Field Communication (NFC) function is embedded in each of the information terminal 1 and the apparatuses, and when the operator operates each of the apparatuses (immediately before or immediately after operating), the user holds the information terminal 1 over an apparatus to cause the apparatus to obtain a terminal ID of the information terminal 1 from the information terminal 1 and transmit the terminal ID and operation information to the HGW 34.

Since the server 4 can obtain a state of the apparatus in real time via communication with the HGW 34, it is possible to reflect the current state of the apparatus to an item of the state in the operation history table that is registered in the DB 41.

It should also be noted that the server 4 may inquire the apparatus about the state of the apparatus via the HGW 34, every time a processing request is received from the smartphone.

Furthermore, the server 4 stores, as logs, a position of the smartphone, details of the processing request, the state of the apparatus, and the like in the DB 41, to be used as control indexes. Then, the server 4 may analyze the control indexes to determine a display mode of a control menu or a user interface of the apparatus.

FIG. 10 is a chart for explaining the dialog display processing (S109) according to Example 1 of Embodiment.

In the dialog display processing at Step S109, when a control signal is transmitted to the server 4, the remote control application transmits a processing request to the server 4 (S301). For example, the processing request is regarding the kitchen lighting apparatus, and includes pieces of information illustrated in FIG. 11, namely, an ID of the smartphone (information terminal 1), position information (positioning information by GPS) of the smartphone, an apparatus ID of a kotatsu, and the like. It is assumed that the smartphone ID and the apparatus ID illustrated in FIG. 11 are previously shared by the server 4 and the remote control application. Here, FIG. 11 is a table indicating details of the information transmitted from the remote control application to the server according to Example 1 of Embodiment.

The position information of the smartphone may include altitude information determined by GPS and the like in addition to the positioning information determined by the GPS. The positioning of the GPS in the position information may be performed regularly, when starting the remote control application, when transmitting to the server 4, or the like. The positioning method of the position information is not limited to GPS. For example, it is also possible to use position information of a base station of the smartphone, or estimate a current position of the smartphone from a move history using an acceleration sensor in the smartphone. It is further possible to determine that the user has left home when the user locks a front door of the home by using the smartphone. In short, there are various methods for estimating (determining) the position information, and any method can be used.

Next, the server 4 obtains operation histories of the respective apparatuses (S302). Each of the operation histories indicates an operation performed on the corresponding apparatus. More specifically, the server 4 obtains the operation histories of the operations performed on the apparatuses from the HGW 34, and updates the state of the operation history table stored in the DB 41. It should be noted that the server 4 may obtain the operation histories after Step S301, or regularly from the HGW 34, or obtain, every time an operation is performed on any of the apparatuses, information indicating the operation as an operation history.

Then, the server 4 performs specifying processing (S303). More specifically, the specifying 42 of the server 4 specifies an attribute of the user based on (a) the smartphone ID notified (transmitted) from the remote control application of the smartphone and (b) the user information table as illustrated in FIG. 12. FIG. 12 is an example of the user information table registered in the DB in the server according to Example 1 of Embodiment. More specifically, if the smartphone ID notified from the remote control application (information terminal 1) is "1", the specifying unit 42 of the server 4 can specify, based on the user information table of FIG. 12, that a holder of the smartphone is a "father" who is an "adult".

Next, the server 4 performs determination processing (S304). More specifically, the determination unit 44 of the server 4 determines whether the smartphone that has issued the processing request is in the home 3 or outside the home 3, based on (a) the current position information of the smartphone which is notified from the remote control application of the smartphone and (b) registered position information of the home.

Here, for example, if a difference between the current position information of the smartphone and the position information of the home is within ±10 m, the determination unit 44 of the server 4 determines that the smartphone is in the home 3. Otherwise, the determination unit 44 determines that the smartphone is outside the home 3. If the smartphone is connected to a wireless LAN in the home 3, the determination unit 44 of the server 4 may determine that the smartphone is in the home 3 regardless of the positioning information.

If it is impossible to obtain the positioning information or if the positioning information is obtained but has a low accuracy, the determination unit 44 of the server 4 may determine that the smartphone is outside the home. This is to restrict functions of the smartphone used outside the home 3 in view of security or the like, so as to prevent that the smartphone operates apparatuses from outside of the home 3 even if the smartphone has such a function. In the above cases, the security is enhanced if the smartphone is determined as being outside the home 3, rather than erroneously determined as being in the home 3.

Hereinafter, it is assumed that the determination unit 44 of the server 4 has determined at S105 that the smartphone (information terminal 1) which has issued the processing request is in the home 3.

Next, the server 4 performs updating processing for updating information of a current state of the apparatus (S307). More specifically, the updating unit 45 of the server 4 obtains a current state of the apparatus indicated by the apparatus ID notified from the smartphone via communications with the HGW 34 that is detecting real-time changing of the states of the apparatuses (S305 and S306). Therefore, the updating unit 45 of the server 4 updates items of the apparatus, such as the operation information G105, the operator G106, and the place G107 in the operation history table illustrated in FIG. 9 (S307).

Next, the server 4 specifies a place of the apparatus indicated in the apparatus information selected at S103, based on the operation history table in the DB 41. Thereby, the server 4 extracts apparatuses in the specified place as target apparatus candidates. Then, display information (dialog) is generated to prompt the user to confirm whether or not to perform predetermined control on a first apparatus that is a target apparatus satisfying a first condition among the extracted apparatus candidates (S308).

According to Example 1, under the first condition, (a) the latest operation history of a target apparatus to be extracted among the operation histories indicates that the target apparatus has been operated to be powered ON, and (b) a predetermined time period (for example, one hour) or more has passed since the time of performing the operation indicated in the latest operation history. The predetermined control is control (first control) for powering OFF the apparatus.

In Example 1, as illustrated in (a) in FIG. 7, the apparatus selected at Step S103 is the kitchen lighting apparatus. Therefore, the generation unit 46 of the server 4 specifies a place of the kitchen lighting apparatus as a "kitchen" according to the operation history table in the DB 41. Then, all apparatuses in the "kitchen" (namely, the microwave, the rice cooker, and the ventilating fan) among the apparatuses in the home are extracted. Here, the generation unit 46 of the server 4 extracts message texts G108 in association with the microwave, the rice cooker, and the ventilating fan from the operation history table in FIG. 9. Then, the generation unit 46 of the server 4 generates a dialog including the extracted message texts G108. More specifically, it is the ventilating fan that is placed in the kitchen and satisfies the first condition, because the user has operated the kitchen lighting apparatus at 7:10 and power of the ventilating fan has been ON for one hour or more until then. In other words, the generation unit 46 of the server 4 generates a dialog for prompting the user to confirm whether or not to power OFF the ventilating fan.

Next, the transmission unit 43 of the server 4 notifies (transmits) the generated display information to the remote control application (S309).

Next, the remote control application displays the dialog according to the notified (transmitted) display information (S310) More specifically, based on the transmitted display information, the remote control application (control unit 15) of the smartphone determines details (display details) and a display mode to be displayed on the user interface region of the display unit 11. Then, the remote control application causes the display unit 11 to display the determined display details in the determined display mode (display screen 110) as illustrated in (b) in FIG. 7, for example.

By referring back to FIG. 5, when the dialog display processing is completed, the remote control application (control unit 15) of the smartphone determines whether or not the user gives a permission to the dialog displayed on the display unit 11 (S110). More specifically, the control unit 15 confirms whether the user of the smartphone taps (touch-inputs) an "YES" button or a "NO" button displayed on the display screen 110 (user interface region). If the user taps the "YES" button (Y at S110), then the generation unit 13 generates a control signal indicating execution instructions of performing the processing (S111). When the remote control application transmits the control signal to the server 4, the remote control system performs the apparatus control processing (S113).

The apparatus control processing at Step S113 differs from the processing at. Step S108 only in that the apparatus to be controlled is the ventilating fan and the control is powering OFF the apparatus. At Step 113, the same processing as described with reference to FIG. 8 is performed, thereby completing and the processing according to remote control illustrated in FIG. 5. On the other hand, if the user taps the "NO" button at Step S110 (N at S110), then the generation unit 13 ends the processing performed by the remote control system illustrated in FIG. 5.

As described above, only the operation on the kitchen lighting apparatus by using the information terminal results in receiving of pieces of operation information regarding the other apparatuses in the kitchen where the kitchen lighting apparatus is located. Then, furthermore, if the fact that power of the ventilating fan has been ON for long hours is displayed with a warning mark, it is possible to notify the user of that the ventilating fan is still ON and has not yet been powered OFF. Moreover, the user can power OFF the ventilating fan, only by replying to the notified dialog.

1.6 Example 2

It has been described in Example 1 that, when the user operates one of the apparatuses in the home by using the information terminal 1, other apparatuses in the same place as that of the operated apparatus are extracted. However, the present invention is not limited to the above. For example, as a screen 701 illustrated in (a) in FIG. 13, it is also possible to display, as place candidates, pieces of place information each indicating a place having apparatuses, and cause the user to select one of the pieces of place information. (a) in FIG. 13 is a diagram illustrating an example of the screen when the user selects one of the pieces of place information, a "living room". In this case, the server 4 extracts message texts G108 of apparatuses in the "living room" from the operation history table in the DB 41.

It has been described in Example 1 that, under the first condition for extracting a message text G108, (a) the latest operation history of a target apparatus to be extracted among the operation histories indicates that the target apparatus has been operated to be powered ON, and (b) a predetermined time period (for example, one hour) or more has passed since the time of performing the operation indicated in the latest operation history. However, the present invention is not limited to the above.

For example, the first condition may include that a target apparatus to be extracted is in a place where the user is not present. Furthermore, for example, the first condition may be that a target apparatus to be extracted is in a place different from a place where an operator is not present. Here, the operator is a person who has performed the latest operation among operations indicated by the operation histories stored in the operation history table. In other words, in any of these cases, an apparatus in a place where the operator who has performed the latest operation is not present is extracted to be controlled.

More specifically, in Example 2, the user's smartphone displays a dialog for prompting the user to confirm whether or not to power OFF a TV as seen in a screen 702 illustrated in (b) in FIG. 13. Among apparatuses in the "living room", the TV satisfies a condition that power has been ON for one hour or more and an operator (father) who has powered ON the TV has left the place where the TV is set. If the user taps "YES" in the dialog, a control signal for powering OFF the TV is generated by the remote control application and then transmitted to the TV via the server 4 and the HGW 34. As a result, the TV is powered OFF according to the control.

Accordingly, it is possible to notify the user of that power of the TV has been ON for one hour or more although the father who had watched the TV has already left home. It should be noted that the determination as to whether or not the operator is in the place where the apparatus is located may be made based on position information transmitted from the information terminal 1 or based on a detection result of a motion detector, a camera, or the like equipped in each of rooms in the home 3.

Although it has been described in Example 2 that a target apparatus for which a dialog is to be generated is extracted when the user selects one of the pieces of place information, the present invention is not limited to the above. It is also possible to extract automatically, for example, every time the remote control application is started, an apparatus in the place (room) where the user is present, as long as the place can be specified.

1.7 Example 3

Although it has been described in Examples 1 and 2 that a dialog regarding an apparatus in a target place is generated by narrowing down the place, the present invention is not limited to the above. For example, as seen in a screen 801 illustrated in (a) in FIG. 14, it is also possible to display pieces of operator information as operator candidates, and cause the user to select one of the pieces of operator information. It is further possible that a dialog for controlling a target apparatus is not displayed. For example, it is possible to display a dialog for prompting the user to confirm whether or not to notify the user of operation information of a new operation when the new operation is performed on an apparatus extracted from pieces of candidate information.

(a) in FIG. 14 illustrates an example where the user selects a "child" as target operator information. In this case, from the operation history table in the DB 41, the server 4 extracts a message text G10$ associated with the operator "child" who has performed the latest operation.

Here, as seen in a screen 802 illustrated in (b) in FIG. 14, the smartphone displays the message text G108 associated with the operator "child" and also a dialog for prompting the user to confirm whether or not to notify operation information of an operation newly performed by the "child". If the user taps "YES" in the dialog, the user can receive operation information performed by the child. For example, the user is notified of when the child gets up by powering ON a lighting apparatus. It should be noted that the operation information the user can receive may be not only operation information indicating a future operation, but also operation information that indicates past operations.

1.8 Effects

As described above, according to Embodiment, it is possible provide a control method capable of recommending, by using an information terminal, next control to be performed by the user according to a situation of a target apparatus.

More specifically, when the user operates an apparatus by using an information terminal, the user obtains operation histories of apparatuses relating to the apparatus. As a result, it is possible to notify the user of the situations of the relating apparatuses. Furthermore, merely by replying to a notified dialog, the user can perform control a target apparatus as recommended in the dialog. More specifically, the user can control, with less operations, an apparatus with a high possibility of being in a situation where the control is required. As a result, the user can cause the apparatus to be in a desired situation without bothersome operations.

1.9 Variations

In Example 1, the user selects one of pieces of apparatus information, and thereby the other apparatuses in the same place as that of the apparatus indicated by the selected apparatus information are extracted. In Example 2, the user selects one of pieces of place information, and thereby apparatuses in the place indicated by the selected place information are extracted. In Example 3, the user selects one of pieces of operator information, and thereby an apparatus operated by the operator indicated by the selected operator information is extracted. However, the present invention is not limited to the above Examples in which selection of the apparatus information, selection of the place information, and selection of the operator information are performed independently. It is also possible to extract an apparatus based on a combination of these kinds of candidate information.

It should also been noted that it has been described in Examples 1 and 2 that a dialog for controlling a target apparatus is displayed after extracting the target apparatus. However, it is also possible to display a dialog for prompting the user to confirm whether or not to notify an operation history in the same manner as described in Example 3, after extracting a target apparatus in the same manner as described in Examples 1 and 2.

It should also been noted that it has been described in Examples 1 and 2 that a dialog for prompting the user to confirm whether or not to perform control of powering OFF is displayed for an apparatus that is in a power ON state, the present invention is not limited to the above. For example, it is also possible that, based on the operation histories in the operation history table, the server 4 generates operation group information. The operation group information is information of an operation group that includes a plurality of operations which have been performed on apparatuses in the same place within the same time period. In this case, the predetermined condition may be a second condition that a target apparatus to be extracted corresponds to an operation that has not yet been performed in the operation group when another operation in the same operation group is performed. If the predetermined condition is the second condition, it is possible to display, when an operation in such an operation group is performed, a dialog for prompting the user to confirm whether or not to perform another operation in the same operation group on an apparatus satisfying the second condition. Then, when the user taps "YES" in the dialog, a control signal for causing the apparatus to perform the other operation is generated and transmitted.

As a result, when the user performs a certain operation on a certain apparatus, the other operation, which is usually performed together with the certain operation, is presented in a dialog on the display unit 11 of the smartphone. Therefore, the user can easily perform operations which are usually performed together, only by replying to the dialog.

It should be noted that it has been described in Embodiment that an attribute of the user, a position of the smartphone, and states of the apparatuses are used as control indexes (indexes for determining a target of control), the present invention is not limited to the above. For example, it is possible that items listed below are desirably combined as control indexes.

Term Explanation

Attributes regarding a person include existence of handicap, demented/wandering, elderly (normal), an adult (working), an adult (house wife), an adult (father), an adult (mother), a male, a female, married, a single, with child, no child, minor, younger than eighteen-year old, a student, a child (student), a child (junior or high school student), a child (elementary school pupil), a child (small child), an infant (crawling), an infant (turning over in bed), individual-authenticated, and a relationship with a nearby person (family, relative, acquaintance/friend, boss/colleague/followership, client, or the like).

Attributes of a time includes a time of operating (early morning, morning, before noon, midday, afternoon, evening, night, midnight, or the like), a using duration, an accumulated using duration, a non-operating duration, last logon date/time, a date, a day of the week, a holiday, an anniversary, and sunrise/sunset times.

Inside home and outside home as places where an operator is present may include the followings.

Outside home: an office, a business trip destination, a station, a parking area, within . . . from home, near home, near outside of home, an entrance, a back door, a balcony Inside home: a living room, a bedroom, a bathroom, a restroom, a lavatory, a kitchen Inside home and outside home as a position where an apparatus is located or a current position may include the followings.

Outside home: near outside of home, an entrance, a back door, a balcony

Inside home: a living room, a bedroom, a bathroom, a restroom, a lavatory, a kitchen Attributes of an apparatus to be controlled may include a type of the apparatus (an electrical heater, a BD recorder, . . . ), whether or not to have a heating function, a kind of communication means (Wireless Fidelity (Wi-Fi), Near Field Communication (NFC), Power Line Communication (PLC), . . . ), existence of a security module, whether or not to deal with privacy information, a kind of a sensor, a kind of an input means, and the like.

Although the integrated remote control User Interface (UI) cooperated with home appliances according to the aspect of the present invention, such as a controller, has been described based on the Embodiment, the present invention is not limited to the embodiment. Those skilled in the art will be readily appreciated that various modifications of the Embodiment and various combinations of the constituent elements in different Examples are possible without materially departing from the novel teachings and advantages of the present invention. Accordingly, all such modifications and combinations are intended to be included within the scope of the present invention.

It should be noted that, in the above-described embodiment, each of the constituent elements may be implemented into a dedicated hardware or implemented by executing a software program suitable for the constituent element. Each of the constituent elements may be implemented when a program execution unit such as a Central Processing Unit (CPU) or a processor reads a software program recorded on a recording medium such as a hard disk or a semiconductor memory and executes the readout software program.

INDUSTRIAL APPLICABILITY

The present invention can be used in a control method of a controller system, and especially in a control method using a mobile information terminal or the like having an integrated remote control UI or a remote control function for cooperating with home appliances to perform remote control to present a user with details of an operation to be performed next.

REFERENCE SIGNS LIST 1, 2 information terry terminal
3 home
4 server
5 network
11 display unit
12 obtainment unit
13 generation unit
14 communication unit
15 control unit
31 optical line terminating device
32 router
33 WLAN AP
34 HGW
35 HEMS
36 home controller
41 DB
42 specifying unit
43 transmission unit
44 determination unit
45 updating unit
46 generation unit
100 remote control system
110 display screen
300 apparatus
301 TV
302 recorder
303 door intercom
304 heating appliance
305 cooking heater
306 lighting apparatus
307 air conditioner
308 water heater

The invention claimed is:

1. A control method used in a remote control system including a plurality of apparatuses and an information terminal that controls at least one of the apparatuses via a network, the control method comprising:
  obtaining, by the information terminal, an operation history of each of the plurality of apparatuses, wherein the operation history of each apparatus includes an apparatus type and identifier, place information indicating a location of the apparatus, identification of an operator of the apparatus, a date and time of when the operator operated the apparatus, and operation information indicating a type of operation the operator performed on the apparatus;
  displaying, on the information terminal, the operation history of each apparatus;
  displaying, on the information terminal, a dialog for prompting a user of the informational terminal to confirm whether or not to perform a predetermined control on a target apparatus, the target apparatus being extracted from the apparatuses according to a selection by the user of at least one of the apparatus type and identifier, the place information, and the identification of the operator, and the target apparatus satisfying a predetermined condition, wherein the predetermined condition indicates that the target apparatus has not yet been powered OFF when a group of apparatuses in the same location as the target apparatus have been powered OFF within a predetermined time period, and wherein in the displaying of the dialog, the dialog prompts the user to confirm whether or not to perform the predetermined control on the target apparatus, the predetermined control being powering OFF of the target apparatus;

generating a control signal for performing the predetermined control on the target apparatus when the user confirms in the dialog that the predetermined control is to be performed on the target apparatus; and transmitting the control signal to the target apparatus via the network, wherein the target apparatus executes the control signal.

2. The control method according to claim 1, wherein in the displaying of the dialog, information indicating the target apparatus that satisfies the predetermined condition is displayed with the dialog in a display mode indicating that the target apparatus satisfies the condition.

3. The control method according to claim 1, wherein the displaying of the dialog further includes displaying, on a user interface region of a display unit in the information terminal, a dialog for prompting the user to confirm whether or not to extract the operation history of the target apparatus, and the control method further comprises when the user confirms in the dialog that the operation history of the target apparatus is to be extracted, (i) extracting the operation history, and (ii) displaying the extracted operation history on the user interface region.

4. The control method according to claim 1, wherein the operator of the target apparatus is the user of the information terminal.

5. The control method according to claim 1, wherein the operator of the target apparatus is not the user of the information terminal.

* * * * *